United States Patent [19]

Roith

[11] 4,096,373

[45] Jun. 20, 1978

[54] WELDING DEVICE AND METHOD

[75] Inventor: Heinz Roith, Munich, Germany

[73] Assignee: Linde Aktiengesellschaft, Wiesbaden, Germany

[21] Appl. No.: 700,776

[22] Filed: Jun. 29, 1976

[30] Foreign Application Priority Data

Jul. 3, 1975 Germany .............................. 2529674

[51] Int. Cl.² .............................................. B23K 9/18
[52] U.S. Cl. .................................. 219/73; 219/73.1; 219/76.15; 219/160
[58] Field of Search ..................... 219/73 A, 73 R, 76, 219/118, 124, 125 R, 125 PL, 126, 137 R, 160; 228/176, 216

[56] References Cited

U.S. PATENT DOCUMENTS

| 2,241,572 | 5/1941 | Armstrong | 219/73 R |
|---|---|---|---|
| 2,324,748 | 7/1943 | Welch | 228/216 X |
| 2,449,371 | 9/1948 | Dutch | 219/160 X |
| 2,719,210 | 9/1955 | Chapman | 219/137 R |
| 3,293,400 | 12/1966 | Brogdon | 219/73 R |
| 3,718,798 | 2/1973 | Randolph et al. | 219/125 R |
| 3,825,716 | 7/1974 | Kokura et al. | 219/73 A |
| 4,017,709 | 4/1977 | Watanabe et al. | 219/73 R X |

*Primary Examiner*—Bruce A. Reynolds
*Assistant Examiner*—N. D. Herkamp
*Attorney, Agent, or Firm*—Karl F. Ross

[57] ABSTRACT

A weld bead is disposed between two workpieces to be welded together by feeding the weld metal to a pool which is advancing relative to the workpieces while supporting the pool of weldment from below with a member which simultaneously serves to maintain the spacing of the workpieces and is preferably composed of tungsten. The support member can be constituted as an electrode. The pool-support member and the burner form a unit which is displaced along the welding gap between the workpieces.

5 Claims, 4 Drawing Figures

WELDING DEVICE AND METHOD

FIELD OF THE INVENTION

The present invention relates to a welding device and method and, more particularly, to a system for welding together a pair of workpieces held in predetermined space relationship while filling the gap between them with a weldment.

BACKGROUND OF THE INVENTION

Welding devices for joining a pair of workpieces by a weldment which bridges across a gap between the workpieces are well known. For the most part they have been employed for the butt welding of two metal plates whose juxtaposed edges are spaced apart to form a welding gap between them. To prevent the pool of weld metal from flowing downwardly through the gap and thus out of the desired location between the edges, it has been proposed heretofore to provide a bath support below the welding gap. This support for the pool of weld metal confines the molten material between the flanks or edges of the workpieces and supports the base of the weld seam until the weld metal solidifies.

In one prior-art concept, the pool support is constituted by a band or strip of material which extends along the entire length of the weld seam. This band is pressed against the underside of the bead of weld material, e.g. by being pressed against the undersides of the two spacedly juxtaposed workpiece plates.

When however, the bead is to be formed between edges of a pair of parallel plates which are disposed in spaced apart vertical planes, the underside of the bead is no longer accessible and it is impossible to press a band or strip of a pool-support material against the underside of the bead.

In these cases it is not uncommon to fit a structure between the plates to define the bottom of the pool of weldment and hence the bottom of the hardened bead. This material should be frangible so that it can be broken up into small pieces by impact or the like to enable its removal from the narrow gap between the workpiece plates. Welding systems of this type are relatively expensive and it is frequently not possible to remove all of the pool-support material. The use of this technique, moreover, is not possible where a pair of coextensive plates are to be welded peripherally together in spaced-apart relationship to define, for example, a compartment between them, e.g. for use in heat exchangers. In this case, at least the support for the last weld bead cannot be removed, or can be removed only with the greatest difficulty.

OBJECTS OF THE INVENTION

It is the principal object of the present invention to provide a welding device or arrangement for joining a pair of spaced apart workpieces whereby the aforementioned disadvantages can be avoided.

Another object of the invention is to provide a device for welding together a pair of workpieces in a manner which is more economical than prior-art techniques.

Still another object of the invention is to provide improved devices for welding together a pair of mutually parallel coextensive plates in face-to-face relationship along the periphery thereof without a dropping through of the pool of weldment.

It is also an object of my invention to provide an improved method of welding together parallel plates in face-to-face spaced apart relationship along at least one edge of the plate without the disadvantages of the prior-art systems mentioned above.

SUMMARY OF THE INVENTION

These objects and others which will become apparent hereinafter are obtained, in accordance with the present invention, by providing the pool support member and the weld-deposition member as a single unit jointly displaceable along the welding gap, i.e. connected for displacement together therealong. Since the pool support member and the weldment deposition member are moved at the same speed of advance along the gap so that a relative displacement of the bath support and workpieces takes place, there is no need to remove a pool support after the seam has been completed, or even to provide a support over the whole length of the weld bead. The contact of the bath support member with the underside of the bead and with the bottom of the pool can be limited to that portion of the length of the seam corresponding to that which is necessary to allow solidification of the pool. In other words the length of the pool support member in the gap between the workpieces need only be equal to the length of the solidifying pool of weld material as the latter is advanced along the gap. The cost of pool support is thus reduced to a minimum, the problem of removal is completely eliminated and the danger of retention of residues of the pool support is also precluded.

According to a feature of the invention, at least the pool-contacting surface of the pool support member is composed of tungsten and the pool support member is mounted on a holder which reaches over an edge of one of the workpieces and is fitted on the welding unit. When the tungsten is provided as a pool-contacting layer on a support, the amount of relatively expensive tungsten which is required for pool support is minimized.

Tungsten, as a pool-contacting member for the support of the molten metal weldment, has proved to be especially effective because of its high melting point and the spontaneous formation of an oxide layer which is of low friction, readily able to slide along the bottom of the weld bead, and which prevents bonding by direct tungsten-aluminum contact. The latter, however, is especially important in the gas-blanket welding of aluminum (e.g. heliarc or T.I.G. welding of aluminum plate). The tendency toward eating away of the pool support member in the contact zone between the tungsten and the pool of weldment is negatived.

The crack-free weld shell is formed when the pool support member in the region of the welding gas is of right-angle profile with the edges parallel to the welding gap and proximal to the pool of weldment being rounded off or reduced.

The system of the present invention has an additional advantage in that the pool support member can be used for positioning the burner unit relative to the welding gap, thereby greatly simplifying the welding process.

In a preferred embodiment of the invention, the pool support member has a pair of lateral flanks which engage the juxtaposed faces of the workpieces and serve for positioning the workpieces relative to the burner and vice versa. Furthermore, if both flanks engage the faces of the workpieces, the pool support member can be constituted as a spacer defining the gap in which the weld bead is to be deposited and hence ensures a uniform spacing of the workpieces along the welding gap.

The holder for the pool support member can reach over an edge of one of a pair of parallel coextensive aluminum workpiece plates to support the tungsten-carrying member in an especially convenient manner. Advantageously, the pool-support member has a width equal to the width of the gap between the plates so that it completely fills the gap. For the formation of relatively long bead stretches, it has been found to be advantageous to provide means for cooling the pool-support member.

Advantageously, the burner unit is a protective-gas arc welding arrangement with a cold-wire feed device, a heat-generating electrode and the pool-support member serving as a counterelectrode. Advantageously, the pool-support member is connected to a cold-wire feed device. Relatively wide welding gaps can be supplied with the weldment without difficulty when the burner unit is pendulously advanced along the welding gap.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
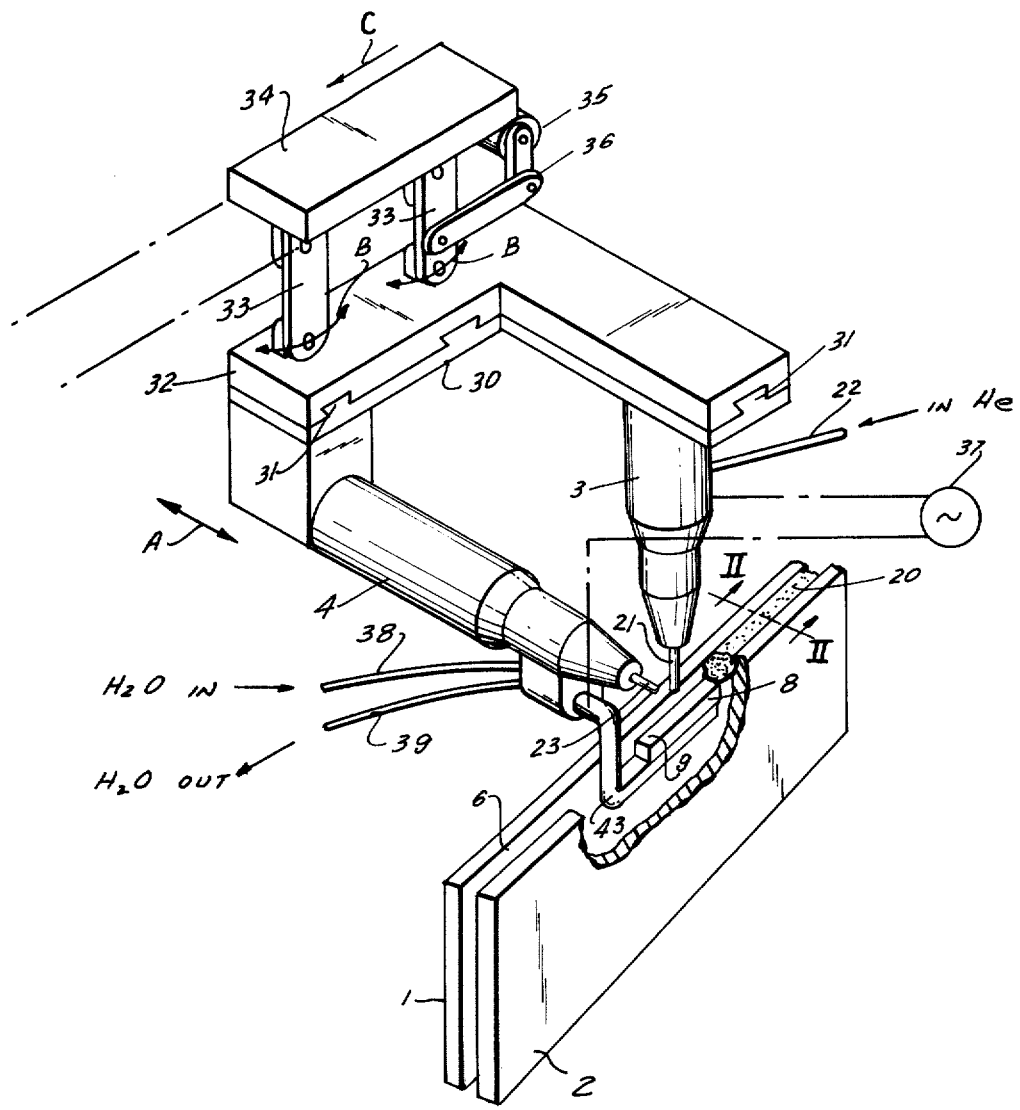
FIG. 1 is a diagrammatic perspective view of a welding device according to the invention.

In FIG. 1 I have shown a perspective view, in diagrammatic form, of a welding device according to the invention for forming a weld bead 20 between a pair of parallel workpiece plates 1 and 2 with a burner unit 3. The burner unit 3 is preferably a tungsten-inert-gas (TIG) burner using a tungsten electrode 21 and supplied with helium via a duct 22, the burner being representative of any arc protective gas welding arrangement. The burner 3 is associated with a cold-wire feed device 4 which advances a wire 23 intended to form the pool of weldment.

Figure 2:
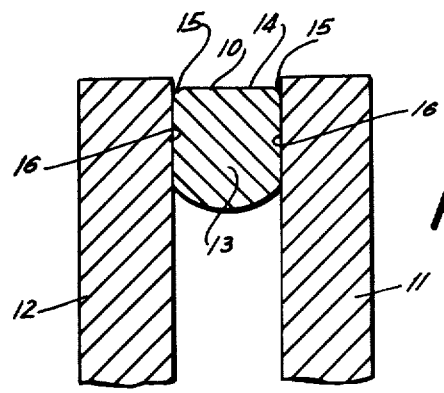
FIG. 2 is a section taken generally along the line II — II of FIG. 1.

The cold-wire feed device 4 has affixed thereto by a mounting 7, a pool-support member 5 which reaches into the gap 6 between the plates and carries a layer 8 which is preferably composed of tungsten and is prismatic (see FIG. 2 for example). The layer 8 can be, however, also composed of other materials which do not readily bond to the deposited weldment. Such materials include copper, carbon and refractory oxides.

The surface 9 of the support layer 8 forms the underside of the pool and hence defines the bottom of the weld bead 20 and is of a length such that the molten materials of the pool cannot drop downwardly between the plates 1 and 2. It has been found to be advantageous to incline the layer 8 slightly toward the rear. This facilitates advance of the pool-support member. The arrow represents the direction of advance of the welding unit.

The burner unit 3 and the pool-support member 5 are coupled together via the cold-wire feed device and thus collectively along the welding gap 6. The pool-support member 5 serves to position the burner unit and the cold-wire feed device 4 relative to the gap.

The layer 8 consists predominantly of tungsten or an alloy of tungsten consisting in larger part of tungsten. Tungsten has an extremely high melting point and little tendency to be eaten away by most metals used in the welding process. Furthermore, the tungsten layer is spontaneously formed with an oxide skin which is highly resistant to corrosion and has excellent slide characteristics to enable the pool-support member to be drawn along the weld bead and between the plates. It has been found to be especially advantageous for use in welding plates of aluminum or aluminum alloys together.

As FIG. 2 shows in section through a welding gap 10 between a pair of juxtaposed workpiece plates 11 and 12, the faces of the plates are parallel to one another and to the lateral flanks of the pool-support member 13. The depth of penetration of the bead into gap 10 can be adjusted simply by raising or lowering the member 13. Member 13 constitutes a simple tungsten electrode and is of approximately rectangular cross section. The surface 14 forming the bottom of the pool and bead, is planar while the flanks 16 are likewise planar. The edges 15 between the flanks 16 and the surface 14 are, however, rounded. The pool-suppot member 13 serves to laterally position the plates 11 and 12 vis-a-vis the welding head.

As has been illustrated diagrammatically in FIG. 1, the burner 3 and the cold-wire bead device 4 can be mounted upon a common support 30 which is laterally guided by dovetails 31 in another member 32. Thus member 30 can move as indicated by the arrow A to position the burner 3 and the cold-wire feed device 4 with respect to the gap 6 when pool-support member 5 is received in the gap.

Member 32 can be supported by rings 33 from a carriage 34 and can be driven by a motor 35 and a crank arrangement 36 so as to oscillate angularly (pendulously) as represented by the arrows B as the carriage 34 is advanced in the direction C along the gap 6. A welding current source 37 is connected to the pool-support member 5 and the tungsten electrode 21 and a cooling device can be provided within the pool-support member and supplied by tubes 38 and 39 with circulated cooling water.

Figure 3:
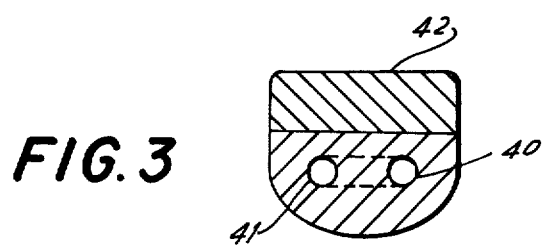
FIG. 3 is a section through another pool-support member according to the invention.
Figure 4:
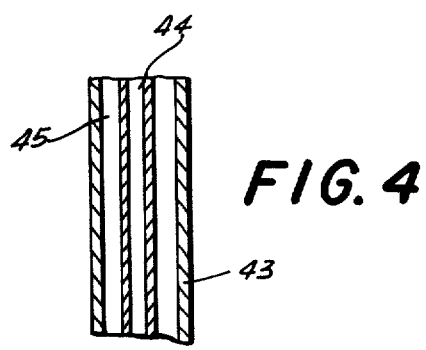
FIG. 4 is a section through a holder therefor.

To this end, as can be seen in FIG. 3, a duct 40 can be provided in a support 41 carrying the tungsten coating 42 of the pool-support member. The pool-support member may be connected to the mounting 7 by a double wall tube 43 defining a pair of passages 44 and 45 for supply of the cooling liquid to the pool-support member and for withdrawal of the cooling liquid.

I claim:

1. A device for welding horizontal edges of a pair of workpieces together across a horizontal welding gap to form a horizontal seam comprising:

a burner unit above said gap for depositing a weldment in a molten pool in said gap;

means for displacing said unit horizontally along said gap;

a pool-support member composed disposed in said gap and juxtaposed with said burner unit for forming a bottom for said pool, at least the pool contacting surface of said member being composed of tungsten, and a holder rigidly fixed to said unit and reaching downwardly into said gap ahead of said pool in the direction of displacement of said unit said member being rigidly connected to said holder.

2. The device defined in claim 1 wherein said pool-support member is a tungsten electrode.

3. The device defined in claim 1 wherein said pool-support member in the region of said gap is of rectangular profile with a pair of rounded edges proximal to the pool and parallel to said direction.

4. The device defined in claim 1, further comprising means for positioning a burner upon said unit, said member laterally positioning said workpieces relative to said burner.

5. A method of welding a pair of coextensive basically juxtaposed plates in face-to-face relationship, along at least one horizontal edge, comprising the steps of:

inserting between said plates a pool-support member of a length equal to a small fraction of the length of said edge with flanks in contact with the juxtaposed faces of said plates and an upper surface composed predominantly of tungsten;

depositing a pool of weld material under an inert gas upon said pool-support member and between said plate to form a weldment therebetween from a burner; and horizontally advancing said burner and said member by connecting said member rigidly to said burner as said weldment solidifies to form a bead along said edge.

* * * * *